United States Patent
Wang et al.

(10) Patent No.: US 8,159,536 B2
(45) Date of Patent: Apr. 17, 2012

(54) METHOD FOR DETECTING DESIRED OBJECTS IN A HIGHLY DYNAMIC ENVIRONMENT BY A MONITORING SYSTEM

(75) Inventors: Junxian Wang, Heng Mui Kang Terrace (SG); How Lung Eng, Heng Mui Kang Terrace (SG); Siew Wah Alvin Harvey Kam, Heng Mui Kang Terrace (SG); Wei Yun Yau, Heng Mui Kang Terrace (SG)

(73) Assignee: Agency for Science, Technology and Research, Centros (SG)

( * ) Notice: Subject to any disclaimer, the term of this patent is extended or adjusted under 35 U.S.C. 154(b) by 1387 days.

(21) Appl. No.: 11/570,559

(22) PCT Filed: Jun. 13, 2005

(86) PCT No.: PCT/SG2005/000191
§ 371 (c)(1),
(2), (4) Date: Apr. 30, 2007

(87) PCT Pub. No.: WO2005/122094
PCT Pub. Date: Dec. 22, 2005

(65) Prior Publication Data
US 2007/0273765 A1    Nov. 29, 2007

(30) Foreign Application Priority Data

Jun. 14, 2004  (SG) .............................. 200403787-5

(51) Int. Cl.
*H04N 7/18* (2006.01)
(52) U.S. Cl. ........... 348/152; 348/81; 348/144; 348/170
(58) Field of Classification Search .................... 348/81, 348/144, 170, 152
See application file for complete search history.

(56) References Cited

U.S. PATENT DOCUMENTS 6,570,608 B1    5/2003    Tserng
(Continued)

FOREIGN PATENT DOCUMENTS

TW    466452 B    12/2001
(Continued)

OTHER PUBLICATIONS

Seki, M., "Background Subtraction based on Cooccurrence of Image Variations", Proceedings of the 2003 IEEE Computer Society Conference on Computer Vision and Pattern Recognition, vol. 2, Jun. 18, 2003, pp. 65-72.

(Continued)

*Primary Examiner* — Quang N. Nguyen
*Assistant Examiner* — Benjamin M Thieu
(74) *Attorney, Agent, or Firm* — Hultquist, PLLC; Steven J. Hultquist; Frank J. Bozzo

(57) ABSTRACT

A background image is generated based on a captured image. A data cluster is formed in pixel blocks of the background image using at least one feature of pixels in the pixel blocks. A data cluster formed in each pixel block includes a data distribution having a mean value and a standard deviation from the mean value. After generating the background image, each pixel of a subsequent captured image is compared with the data cluster of a pixel block of the background image to generate a first discrepancy value. A pixel of a subsequent image is compared with a data distribution of another adjacent pixel block of the background image to generate a second discrepancy value. Based on the discrepancy values, the pixels of the subsequent image are regarded as background or foreground pixels in a binary map, in which connected foreground pixels are marked to form a foreground object.

26 Claims, 7 Drawing Sheets

U.S. PATENT DOCUMENTS

| | | | |
|---|---|---|---|
| 2003/0058237 A1 | 3/2003 | Lee | |
| 2003/0108238 A1 | 6/2003 | Xu | |
| 2004/0151374 A1* | 8/2004 | Lipton et al. | 382/181 |
| 2005/0047656 A1* | 3/2005 | Luo et al. | 382/167 |

FOREIGN PATENT DOCUMENTS

| | | |
|---|---|---|
| TW | 541773 B | 7/2003 |
| TW | 569028 B | 1/2004 |
| TW | 569029 B | 1/2004 |

OTHER PUBLICATIONS

Elgammal, A. et al., "Non-parametric Model for Background Subtraction", European Conference on Computer Vision, vol. 1843, Jun. 1, 2000, pp. 751-767.

Lu, W. et al., "A Vision-Based Approach to Early Detection of Drowning Incidents in Swimming Pools", IEEE Transactions on Circuits and Systems for Video Technology, vol. 14, No. 2, Feb. 1, 2004, pp. 159-178.

Duda, R. et al., "Pattern 1-16, Classification, Second Ed., Chapter 10: Unsupervised Learning and Clustering", Dec. 31, 2001; pp. 517-528.

Astola, J., et al., "Vector median filters", "Proc. IEEE", Apr. 1990, pp. 678-689, vol. 78, No. 4.

Boult, T.E., et al., "Into the woods: visual surveillance of noncooperative and camouflaged targets in complex outdoor settings", "Proc. IEEE", Oct. 2001, pp. 1382-1402, vol. 89, No. 10.

Comaniciu, D., et al., "Mean shift: a robust approach toward feature space analysis", "IEEE Trans. Pattern Anal. Machine Intell.", May 2002, pp. 603-619, vol. 24, No. 5.

Elgammal, A., et al., "Background and foreground modeling using nonparametric kernel density estimation for visual surveillance", "Proc. IEEE", Jul. 2002, pp. 1151-1163, vol. 90, No. 7.

Friedman, N., et al., "Image Segmentation in Video Sequences: A Probabilistic Approach ", "In Proc. 13th Conf. Uncertainty in Artificial Intelligence UAI '97", 1997.

Fujikake, H., et al., "Video camera system using liquid-crystal polarizing filter toreduce reflected light", "IEEE Trans. Broadcasting", Dec. 1998, pp. 419-426, vol. 44, No. 4.

Grimson, W.E.L., et al., "Using adaptive tracking to classify and monitor activities in a site", "Proc. Computer Vision and Pattern Recognition", Jun. 1998, pp. 22-29.

Haritaoglu, I., et al., "W4: real-time surveillance of people and their activities", "IEEE Tran. Pattern Anal. Machine Intell.", Aug. 2000, pp. 809-830, vol. 22, No. 8.

Liu, Sze-Chu, et al., "Statistical change detection with moments under time-varying illumination", "IEEE Tran. Image Processing", Sep. 1998, pp. 1258-1268, vol. 7, No. 9.

Stauffer, C., et al., "Adaptive background mixture models for real-time tracking", "Proc. Computer Vision and Pattern Recognition, vol. 2", Jun. 1999, pp. 246-252.

Stauffer, C., et al., "Learning patterns of activity using real-time tracking", "IEEE Trans. Pattern Anal. Machine Intell.", Aug. 2000, pp. 747-757, vol. 22, No. 8.

Wren, Christopher Richard, et al., "Pfinder: Real-Time Tracking of the Human Body ", "IEEE Trans. Pattern Anal. Machine Intell.", Jul. 1997, pp. 780-785, vol. 19, No. 7.

Bezdek, J. , "Pattern Recognition with Fuzzy Objective Function Algorithms", 1981, pp. 1-256, Publisher: Plenum Press.

Duda, R. et al., "Pattern Classification : Chapter 10 Unsupervised Learning and Clustering", "Pattern Classification", 2001, pp. 526-530, Publisher: John Wiley and Sons.

Eng, How-Lung, et al., An automatic drowning detection surveillance system for challenging outdoor pool environments, Found on-line Dec. 13, 2006 at <http://lear.inrialpes.fr/people/triggs/events/iccv03/cdrom/iccv03/0532_eng.pdf>, Oct. 2003, Publisher: 9th International Conference on Computer Vision, ICCV 03.

Hayashi, Akira, et al., Multi-object Motion Pattern Classification for Visual Surveillance and Sports Video Retrieval, Found on-line Dec. 13, 2006 at <http://www.cipprs.orgivi2002/pdf/s2-4.pdf>, May 2002, pp. 27-29, Publisher: 15th International Conference on Vision Interface, Calgary, Canada.

Zang, Qi, et al., Object Classification and Tracking in Video Surveillance, Found on-line Dec. 13, 2006 at <http://www.citr.auckland.ac.nz/techreports/2003/CITR-TR-128.pdf>, 2003, p. CIR-TR-128, Publisher: Centre for Image Technology and Robotics, Computer Science Department, The University of Auckland.

\* cited by examiner

METHOD FOR DETECTING DESIRED OBJECTS IN A HIGHLY DYNAMIC ENVIRONMENT BY A MONITORING SYSTEM

CROSS-REFERENCE TO RELATED APPLICATIONS

This application is filed under the provisions of 35 U.S.C. §371 and claims the priority of International Patent Application No. PCT/SG2005/000191 filed 13 Jun. 2005, which in turn claims the priority of Singapore Patent Application No. 200403787-5 filed 14 Jun. 2004. The disclosures of said International Patent Application and said Singapore Patent Application are hereby incorporated herein by reference, in their respective entireties.

BACKGROUND OF THE INVENTION

The invention relates to a monitoring system and a method for detecting at least one object in an environment by the monitoring system.

A surveillance system is commonly installed in places such as homes, offices and other public areas to monitor activities occurring in these environments. In the surveillance system, cameras, video cameras or other sensing devices are often used to capture images or videos of the environments, and usually an operator (a person) analyzes the captured images or videos to understand and monitor the activities occurring in the environments.

For example, a surveillance system may be installed in a building to monitor the presence of intruders in the building. In another example, a surveillance system may be installed to monitor the activities of a swimming pool. The real-time images or videos of the swimming pool provided by the surveillance system may be monitored by a person who, upon detecting any possible drowning or accidents in the pool, can send a lifeguard to the pool to assist any swimmers in distress.

Automated surveillance systems are developed to automatically understand and monitor activities in an environment. Therefore, it is not necessary for a person to analyze the captured images or videos in order to understand and monitor the activities in the environment.

In such an automated surveillance system, images or videos of the environment captured by the cameras are processed by a processing unit, for example in a computer, for detecting desired objects in the environment. The detection of desired objects, which are known as foreground objects, is performed using the background subtraction method [2].

In the background subtraction method, a representation of the background scene of the environment is built, and current images of the environment are subsequently compared with the representation of the background scene to determine the foreground objects. Depending on the application of the automated surveillance system, the detected foreground objects may be tracked using a tracking algorithm to monitor the activities of the foreground objects.

To form a representation of the background scene of an environment, each pixel of the background scene is represented by a pixel value, such as luminance or chrominance, and the distribution of the pixel value over time. The distribution of the pixel values over time is normally represented using a probability distribution such as a Normal distribution or a Gaussian distribution. All the distributions of all the pixel values of the background scene form the representation of the background scene (background models) of the environment [1]-[7].

After the representation of the background scene is formed, current images are compared with the representation of the background scene, and the results of the comparison are thresholded to obtain the foreground objects.

The existing automatic surveillance systems using the above-described background subtraction method is more suitable for detecting foreground objects in an environment having a static or a slow-changing background. However, when the background of the environment changes drastically or contains large dynamic noise portion, for example due to reflection of light from a swimming pool, the existing automatic surveillance systems become ineffective in detecting the foreground objects.

Therefore, it is desirable to provide a method for detecting foreground objects effectively in an environment even when the background of the environment changes drastically or contains large dynamic noise portion.

SUMMARY OF THE INVENTION

The invention relates to a monitoring system and a method for detecting at least one object in an environment, in particular in a highly dynamic environment, by the monitoring system according to the features of the independent claims. Preferred embodiments of the invention are defined in the dependent claims.

In the method of detecting the at least one object in the environment according to the invention, at least one image of the environment is taken using an image capturing device, such as a camera or a video camera, of the monitoring system. The image capturing device can be any type of vision sensors that convert a section of the electromagnetic spectrum into a two dimensional image such as the normal visible light spectrum or the infra-red spectrum. Based on the image of the environment, at least one background image is generated. The background image, which comprises a plurality of pixels, is divided into pixel blocks. In each pixel block, at least one data cluster is formed using at least one feature of the pixels in the pixel block. The data cluster formed in each pixel block is described as a data distribution having a mean value and a standard deviation from the mean value. A collection of all the mean values and standard deviation values of all data clusters of the background image forms a representation of the background.

After generating the background representation, a subsequent image is taken by the monitoring system. Each pixel of the subsequent image is compared with the background. Specifically, each pixel of the subsequent image is compared with the data distribution of a corresponding pixel block of the background image. A first discrepancy value is generated as a result of this comparison. Depending on an estimated degree of movement of a local region defined by a local search window, the pixel of the subsequent image is further compared with the data distribution of at least another pixel block which is adjacent to the pixel block of the background image corresponding to the pixel. A second discrepancy value is generated as a result of this comparison with the other pixel block.

Based on the first and second discrepancy value, the pixel of the subsequent image is determined to be either a background pixel or a foreground pixel. After all the pixels in the subsequent image have been determined as either a background or a foreground pixel, a binary map of the subsequent image is generated with the pixels of the binary map representing either a foreground pixel or a background pixel. The connected foreground pixels in the binary map are marked to form a foreground object, which is the detected objected in the environment according to the invention.

It should be noted that the image of the environment may be an image directly obtained from the camera, or a video frame of the video obtained from the video camera, or a two dimensional image captured and converted using any type of vision sensors. The image of the environment includes the at least one object, which is called the foreground, and the background. The generated background image is therefore the image of the environment with the foreground removed.

Each feature of the pixels in each pixel block is used to form one data cluster. Each data cluster formed is also called a homogeneous region in the pixel block. The pixels of the background image may comprise more than one feature, and each of these features can be used to form one data cluster or region in each pixel block. Each data cluster or region, which is being modeled as a respective data distribution, is a background model of the background of the environment. Therefore, the background comprises a plurality of background models (at least one model in each pixel block of the background image) for describing the background of the environment.

After all the background models for all the pixel blocks of the background image have been formed, the method according to the invention proceeds with the detection of the at least one foreground object.

The block size of the pixel blocks of the background image depends on the desired resolution of the background models for representing the background image. A high resolution of the background models for representing the background image requires a large number of pixel blocks in the background image. This results in a small number of pixels in each pixel block of the background image. Conversely, a low resolution of the background models for representing the background image requires only a small number of pixel blocks in the background image. This results in a large number of pixels in each pixel block of the background image.

A high resolution of the background models for representing the background image has the advantage of a more accurate detection of foreground objects. However, the computation power required for generating the background models representing the background image, and also the subsequent updating of the background models, is very high.

Furthermore, the size of foreground objects, the movement of the foreground objects and the movement of the background also determines the desired block size of the pixel blocks, and hence, the resolution of the background models of the background image. If the size and movement of the foreground objects and/or background are large, the block size of the pixel blocks of the background image should also be large, so that a large spatial movement of the pixel of the subsequent image can be captured.

Therefore, the desired block size of the pixel blocks of the background image should be determined based on a trade-off between the available computation power and the desired spatial movement of the pixel of the subsequent image to be captured.

As can be seen from above, the use of a region-based background modeling of the background image according to the invention allows a low computational detection algorithm to be implemented. Therefore, the method according to the invention can be implemented in portable computer systems or devices that do not have a processor capable of performing intensive computations.

It should also be noted that each pixel of the subsequent image is compared not only with the background model (specifically the at least one data cluster) of the pixel block corresponding to the pixel of the subsequent image, but also with the background model of at least one further pixel block which is adjacent to the pixel block corresponding to the pixel of the subsequent image. A local search window may be used to determine the number of adjacent pixel block(s) which the pixel of the subsequent image is to be compared with.

The comparison of the pixel of the subsequent image with the background model of the corresponding pixel block of the background image allows the spatial movement of the pixel within the pixel block to be captured. By extending the comparison of the pixel of the subsequent image to at least one neighboring pixel block of the background image, a larger spatial movement of the pixel can be captured. Such a feature has the advantage of having a low error of misclassifying background pixels as foreground pixels due to movement in the background such as shadows.

As an example, a background object corresponds to a pixel position in a first pixel block of the background image. Due to some movement in the background, the pixel position of the background object in the subsequent image may correspond to a second pixel block of the background image. By comparing the pixel corresponding to the background object in the subsequent image with the second pixel block (adjacent to the first pixel block) according to the invention, the spatial movement of the pixel corresponding to the background object is captured. Therefore, said pixel of the background object due to background movement is not wrongly classified as a foreground pixel.

Furthermore, the capturing of the spatial movement of a pixel of the subsequent image in a corresponding pixel block and at least a further adjacent pixel block of the background image according to the invention takes into account of background movement in the environment, and hence, resulting in a high foreground detection rate and low false detection of background pixels as foreground pixels. Therefore, the method according to the invention is suitable to be used in both indoor as well as outdoor environment which has a dynamic background. One such application for the method according to the invention is to detect swimmers in a swimming pool.

According to an embodiment of the invention, the size of the local search window used to determine the number of adjacent pixel block(s) with which the pixel of the subsequent image is to be compared is determined from an estimated rate of movement of the background object detected in the image. The direction of movement of the local search window is determined from an estimated direction of movement of the background and foreground objects.

Accordingly, generally speaking, in this embodiment a mechanism is used that allows the size of the local search window to vary (preferably automatically and dynamically) with respect to the local background and foreground movements. The size of such local search window will then be updated and varied at different positions in the image when processing the next frame. This will enhance the efficiency of the process to capture background and foreground movements. As mentioned, such a mechanism can be carried out automatically by computing the rate of movement and the direction of movement of background and foreground objects. One possible way to (automatically) compute both, i.e. rate of movement and direction of movement is based on the searching range and direction obtained after matching a pixel to its corresponding background or foreground model within the local search window. Then, such information will be propagated to the following frame that varies the local search window when processing the said pixel.

According to an embodiment of the invention, the generation of the background image of the environment includes determining the pixels representing the object in the environment by applying a shades of intensity or color model to the image of the environment, removing the information of the pixels representing the object, and filtering the resultant image of the environment using a filtering scheme. This filtering scheme which is applied on a number of past images, can be any suitable respective scheme such as a temporal vector median filter, and is used to generate a clean background image which does not have any foreground objects. Examples of other suitable filters are temporal rank filter and temporal mean filter.

Depending on the shades of intensity or color of the object to be detected, an appropriate shade or color model is applied to the image of the environment to isolate the pixels corresponding to the object. These isolated pixels will not be considered as background pixel when computing the background models. For example, if a swimmer is to be detected in a swimming pool using a color camera, a generic skin color model can be established. By applying this generic skin color model on the image captured by the color camera, all pixels with characteristics similar to the skin color model will be considered as skin pixels corresponding to the swimmer. The color information of the isolated pixels corresponding to the object is then removed from the background formation process.

Subsequently, the image of the environment is filtered using a filtering scheme which is applied on a number of past images, such as the temporal vector median filter, to remove any residual information representing the object. This process of generating the clean background image can normally be summarized in the following steps:

Collecting a set of T number of pixel values at each position (i,j) of the image from a series of consecutive T number of frames.

Performing vector median filtering [13] operation on each set of T number of pixel values collected.

Using the output of the vector median filtering operation as the background pixel for position (i,j).

Repeating the process for all positions (i,j) in the image to form one background frame.

In this way, the clean background image can be generated automatically at any time without requiring any human intervention. The advantages of generating the background image using a shade or color model to isolate the pixels of the object and filtering said pixels using a temporal vector median filter as described above are that the generation of the background image can be performed at any time, is low in complexity, and can be implemented easily.

Alternatively, the pixels corresponding to the object in the environment may be isolated manually by a person observing the image obtained from the image capturing device, and then substituting the color of these isolated pixels with a suitable color representing the background. Another way is to capture a sequence of videos containing only the background without any foreground objects. This requires additional effort to ensure that there are no foreground objects present in the considered environment when building the background models.

According to an embodiment of the invention, each data cluster of each pixel block of the background image is updated based on the determined background pixels of the subsequent image.

Specifically, the mean value and the standard deviation from the mean value of the data cluster of each pixel block of the background image are updated by the background pixels in the subsequent image corresponding to the pixel block of the background image. Such updating of the data clusters in all the pixel blocks of the background image generates a new/updated background image which adapts to changes in the background of the environment. Such background changes, for example due to change of illumination caused by blocking of sunlight by clouds, ripple movement of water, movement of leaves, etc, are common in natural environment.

It is also possible, when updating the data clusters of the background image, to create new data clusters in some of the pixel blocks of the background image. The creation of such new data clusters allows background information which is not captured previously to be incorporated. The creation of such new data clusters may be subjected to a criteria of having the shade or color standard deviation to be below a predetermined value so as to eliminate the possibility of creating new data clusters which are due to noise.

Similarly, some existing data clusters in each pixel block of the background image may be eliminated if there is no background pixel in the subsequent image being classified to such data clusters after a predetermined time. Such data clusters may correspond to some background objects being removed from the environment, and hence, data clusters corresponding to said background objects should also be removed accordingly.

Such creation and removal of data clusters in and from the pixel blocks of the background image are advantageous in maintaining a dynamic representation of the background of the environment without having to rebuild the background representation at each instance when processing the subsequent images.

According to a further embodiment of the invention, the data cluster of each pixel block of the background image is updated using a devised recursive linear interpolation scheme. Other recursive linear interpolation schemes such as those using ARMA filters or Kalman filters may also be used.

According to a further embodiment of the invention, the data cluster of each pixel block of the background image obtained at a specific time and/or at the occurrence of a specific condition of the environment is stored. This allows the data cluster of each pixel block of the background image corresponding to the specific time and/or condition to be obtained from the stored models, if necessary, when the system needs to be initialized or rebooted. According to an embodiment of the invention, the subsequent image is divided into pixel blocks of pixels. For each pixel block which comprises at least one foreground pixel, at least one data cluster is formed based on at least one feature of the foreground pixel in the pixel block. The data cluster of the pixel block of the subsequent image comprising the foreground pixel is modeled as a data distribution having a mean value and a standard deviation from the mean value. When an object is to be detected in a next subsequent image of the environment, each pixel of the next subsequent image is compared with the data cluster of the pixel block of the subsequent image corresponding to said pixel, if such a data cluster of the pixel block of the subsequent image corresponding to said pixel exists, to determine if said pixel of the next subsequent image is a foreground pixel.

In this embodiment of the invention, foreground models of the environment are generated. The use of the foreground models for determining whether the pixels of a next subsequent image of the environment captured by the monitoring system is a foreground pixel improves the segmentation accuracy of detected foreground object. In addition, the use of foreground models causes the error of misclassifyig any foreground pixels of the next subsequent image as background pixels to be low.

After the foreground pixels of the next subsequent image have been determined by comparing with the foreground model, the rest of the pixels of the next subsequent image can be determined to be either background pixels or foreground pixels by comparing with the updated background models of the background image.

In this case when the pixel of the next subsequent image does not have a corresponding data cluster of the pixel block of the subsequent image, said pixel will be determined whether it is a background pixel or a foreground pixel by being compared with the updated background model of the corresponding pixel block of the background image.

More than one data clusters may be formed in each pixel block of the subsequent image comprising at least one foreground pixel based on more than one feature of the foreground pixels. However, if the foreground object is assumed to be an object having a generally uniform shade of intensity or color, one data cluster based on the color feature of the foreground pixels would be sufficient to describe the foreground pixels in each pixel block.

It should be noted that it is possible not to have foreground models of the environment generated for the subsequent image. In this case, all the pixels of the next subsequent image are compared with the updated background models of the background image to determine whether said pixels are background pixels or foreground pixels.

According to a further embodiment of the invention, each pixel of the next subsequent image is further compared with the data cluster of a further pixel block of the subsequent image, if such a foreground data cluster of the further pixel block of the subsequent image exists, to determine if said pixel is a foreground pixel. The further pixel block of the subsequent image is adjacent to the pixel block of the subsequent image corresponding to said pixel. The number of adjacent pixel block(s) to be considered can be determined from the rate of movement of the foreground object detected in the image As already explained above, the comparison of the pixel of the next subsequent image with the foreground model of the at least one neighboring pixel block of the subsequent image allows a large spatial movement of the pixel to be captured. The capturing of such a large spatial movement of the pixel results in a low error of wrongly classifying foreground pixels as background pixels, for example, due to movement of the foreground objects into shadowed areas.

According to an embodiment of the invention, each data cluster of the pixel blocks of the subsequent image comprising at least one foreground pixel is updated based on the determined foreground pixels of the next subsequent image.

Specifically, the mean value and the standard deviation from the mean value of the data cluster of the pixel block of the subsequent image having at least one foreground pixels are updated by the foreground pixels in the next subsequent image corresponding to the pixel block of the subsequent image. As mentioned above for the updating of background models, such updating of the data clusters in the pixel blocks of the subsequent image generates new/updated foreground models which adapt to changes to the movement of the foreground objects in the environment.

According to a further embodiment of the invention, the data cluster of the pixel blocks of the subsequent image comprising at least one foreground pixel is updated using an interpolation scheme such as the recursive linear interpolation scheme. Alternatively, the foreground models representing the foreground of the environment are recalculated every time when any foreground is detected in the currently processed frame. The recalculation of foreground models can be performed in real-time since the number of pixels involved in the recalculation of foreground models is small. Like in the case of background updating, the updating of foreground generates a new/updated representation which adapts to any changes in the foreground.

According to an embodiment of the invention, the difference in value between the mean value of the data cluster of the pixel block of the background image corresponding to the pixel of the subsequent image and the value of the corresponding feature of said pixel of the subsequent image is obtained. The obtained difference in value is then divided by the standard deviation of the at least one data cluster of the pixel block of the background image to generate the first discrepancy value. Thus, the first discrepancy value is a normalized value. The corresponding feature of said pixel is the feature of the pixels in the pixel block of the background image used to form the data cluster.

Similarly, the difference in value between the mean value of the data cluster of the further pixel block which is adjacent to the pixel block of the background image corresponding to the pixel of the subsequent image and the value of the corresponding feature of said pixel of the subsequent image is obtained. The obtained difference in value is then divided by the standard deviation of the at least one data cluster of the pixel block of the background image. Thus, the second discrepancy value is also a normalized value.

The generation of the first and second discrepancy values as the normalized values which correspond to the difference in the value of the pixel of the subsequent image with their respective mean value of the data clusters, and divided by the standard deviation of the corresponding data cluster is a simple and low-complexity way of comparing the pixel with the respective data clusters.

According to a further embodiment of the invention, the pixel of the subsequent image is determined as a background pixel if the minimum value of the first and second discrepancy values is smaller than a predetermined threshold. If said minimum value is greater than the predetermined threshold, the pixel of the subsequent image is determined as a foreground pixel.

The comparison of the pixel of the subsequent image with data cluster of the pixel block of the background image based on the minimum value of the first and second discrepancy values ensures that a background pixel is not classified as a foreground pixel, and hence, resulting in low false detection of foreground.

It should be noted that it is also possible to compare the pixel of the subsequent image with data cluster of the pixel block of the background image based on an average value of or other predefined relationship between the first and second discrepancy values such as the median or the minimum of the discrepancy values.

According to a yet further embodiment of the invention, each pixel of the subsequent image is further determined to be either a background pixel or a foreground pixel using a further predetermined threshold, wherein the further predetermined threshold has a different value from the predetermined threshold. The further predetermined threshold normally has a larger value than the predetermined threshold. After all the pixels of the subsequent image have been determined as either background pixels or foreground pixels based on the further predetermined threshold, a further binary map is generated accordingly. A modified binary map is generated based on the further binary map, with each element in the modified binary map corresponding to whether the number of foreground pixels in a corresponding pixel block of the further binary map exceeds a predefined value. The elements which are connected in the modified binary map and corresponding to the number of foreground pixels in the pixel block of the further binary map exceeding the predefined value are marked to form at least one foreground portion. The foreground object in the binary map is determined to be the object detected in the environment only if the foreground object corresponds to the foreground portion in the modified binary map.

In this yet further embodiment of the invention, two binary maps of background and foreground pixels (the binary map and the further binary map) are generated based on two predetermined thresholds (the predetermined threshold and the further predetermined threshold) having different values. As the predetermined threshold used for generating the binary map is low, a good segmentation of the foreground objects can be achieved. However, the binary map may also comprise foreground noise as a result of wrongly classified background pixels as foreground pixels. The further binary map generated using the further predetermined threshold has less foreground noise compared to the binary map as the further determined threshold has a value that imposes a stricter condition, for example having a higher value, for determining foreground pixels than the predetermined threshold. By generating the modified binary based on the further binary map, the foreground noise is further reduced. Thus, a "clean" and accurate segmentation of the foreground can be achieved based on the binary map and the modified binary map.

Accordingly, the determining of whether the foreground object is the object detected in the environment using the modified binary map results in high sensitivity in the detection of foreground object as the detected object and a low mis-classification of movement in the background as foreground object.

According to an embodiment of the invention, a motion frequency of each pixel of the subsequent image is determined before comparing said pixel with the data cluster of the corresponding pixel block of the background image. Based on the determined motion frequency of the pixels of the subsequent image, pixels corresponding to an area of the subsequent image which represents a noise portion, such as due to reflection from a light source, are classified. The classified pixels are subsequently filtered using a pseudo-shade filter to generate a pseudo-shade for the classified pixels based on an average shade information of the classified pixels, excluding the value that represents the noise portion. The motion frequency of a pixel measures the fluctuation of a value of the pixel over time. Based on the motion frequency of the pixel, it can be determined if the pixel correspond to a noise portion such as that caused by an area of reflection by a light source.

For example, the noise portion can be caused by reflection of sunlight or an artificial light by the water surface. Such reflection may obscure the foreground object, and hence, makes the detection of foreground object to be difficult. In such a case, since visible light spectrum is considered, a pseudo-color filter is used. By applying the pseudo-color filter to the area corresponding to the reflection from the light source, the foreground object in the reflection area can be detected. The pseudo-color filter determines an average color information of the pixels (called pseudo-color), except white color (which is the color of the reflection of the light source), and substitutes said pixels with the pseudo-color such that the "color" of the pixels caused by the reflection is removed. In this respect, it is noted that a reflective area will become noisier if the water surface becomes more disturbed which can be caused, for example, by higher swimming activities.

Therefore, the method according to this embodiment of the invention provides an additional mechanism which enables the foreground to be detected, even though the foreground object enters into an area where the pixels corresponding to the foreground object is partially obscured by large noise, such as reflection from a light source.

According to a further embodiment of the invention, the average shade of intensity or color information of the classified pixels is obtained from a predefined number of consecutive subsequent images. The obtaining of the average shade or color information over a predefined number of consecutive subsequent images takes into account the value of the pixels over time, and hence, results in an accurate average shade or color information of the pixels.

According to a further embodiment of the invention, the pixels of the subsequent image corresponding to the pixels of a fast moving foreground object are classified based on the determined motion frequency of the pixels of the subsequent image. The classified pixels corresponding to the pixels of the fast moving foreground object are filtered using a mean filter.

The filtering of the pixels corresponding to the fast moving foreground object removes undesired noise from the subsequent image.

According to an embodiment of the invention, color is used as the at least one feature of the pixels of each pixel block of the background image for forming the data cluster in the pixel block. The color feature of the pixels is stable, and does not change drastically due to change in external environment such as illumination change.

It should be noted that other features of the pixels of the pixel block of the background image, such as brightness, texture and any visible spectrum features, or shades of intensity in the other spectrum besides the visible spectrum, may also be used for forming the data cluster in the pixel block in alternative embodiments.

In a further embodiment of the invention, the background image obtained from a color camera is converted into the Commission International de L'Eclairage (CIE) Lab color space (CIELab) before dividing said background image into the plurality of pixel blocks. The different components of the CIELab color space of each pixel are independent, and can be computed independently without losing much segmentation accuracy. In particular, the luminance component (i.e. L component) is decorrelated from the chrominance component (i.e. a and b components). Furthermore, the CIELab color space is able to better mimic the logarithmic response of the eye compared to the other color spaces such as RGB or YUV color spaces. Thus, segmentation results obtained when working on the CIELab color space are better than the other color spaces.

It should be noted that the background image obtained from a color camera can be converted into other color spaces such as the Red Green Blue (RGB) color space, the YUV (where Y is a luminance component and U and V are chrominance components) color space and the Hue, Saturation and Intensity (HSI) color space.

According to an embodiment of the invention, at least a Gaussian distribution (i.e., a single or multiple multivariate Gaussian Distribution(s)) is used to model the data distribution in each pixel block of the background image. The Gaussian distribution(s) is able to model the background of an environment accurately, and is also able adapt to changes of the background. In alternative embodiments, the data distribution in each pixel block of the background image can be modeled using a Poisson distribution or a Laplacian distribution or other suitable distributions.

The pixel blocks of the background image are preferably square pixel blocks. The dividing of the background image into square blocks is low in complexity, and also allow an easy grouping of pixels into each block. It should however be noted that it is possible to divide the background image into a plurality of pixel blocks having a hexagonal, triangular or any other shapes in other embodiments.

As mentioned earlier, the method according to the invention is able to detect objects in an environment having a dynamic background. Therefore, the method according to the invention is suitable to be used in an aquatic environment, where the background is always changing due to movement of water, for detecting humans. An example would be detecting swimmers in a swimming pool. However, the method according to the invention can also be used to detect other objects in an environment having a static background.

The invention further relates to the monitoring system for detecting at least one object in an environment. The monitoring system comprises at least one camera or video camera for taking a plurality of images of the environment. A processing unit is being adapted to process and generate a background image of the environment based on the image of the environment, wherein the background image comprises a plurality of pixels, and to divide the background image into a plurality of pixel blocks. A formation unit is being adapted to form at least one data cluster of each pixel block based on at least one feature of the background pixels in the pixel block, wherein the at least one cluster is modeled as a data distribution having a mean value and a standard deviation from the mean value. A comparison unit is being adapted to compare each pixel in each subsequent image from a plurality of subsequent images of the environment with the at least one data cluster of the pixel block of the background image corresponding to said pixel to generate a first discrepancy value, and to compare said pixel with the at least one data cluster of at least one further pixel block of the background image to generate a second discrepancy value, wherein the at least one further pixel block is adjacent to the pixel block corresponding to said pixel. A determination unit is being adapted to determine whether said pixel of the subsequent image is a background pixel or a foreground pixel based on the first discrepancy value and the second discrepancy value. A generation unit being adapted to generate a binary map of the subsequent image based on the determined background pixels and the foreground pixels. A marking unit is being adapted to mark connected pixels in the binary map corresponding to the background pixels to form at least one foreground object, wherein the at least one foreground object is the at least one object detected in the environment.

BRIEF DESCRIPTION OF THE FIGURES

Illustrative embodiments of the invention are explained below with reference to the drawings, in which.

DETAILED DESCRIPTION OF THE EMBODIMENTS OF THE INVENTION

Figure 1:
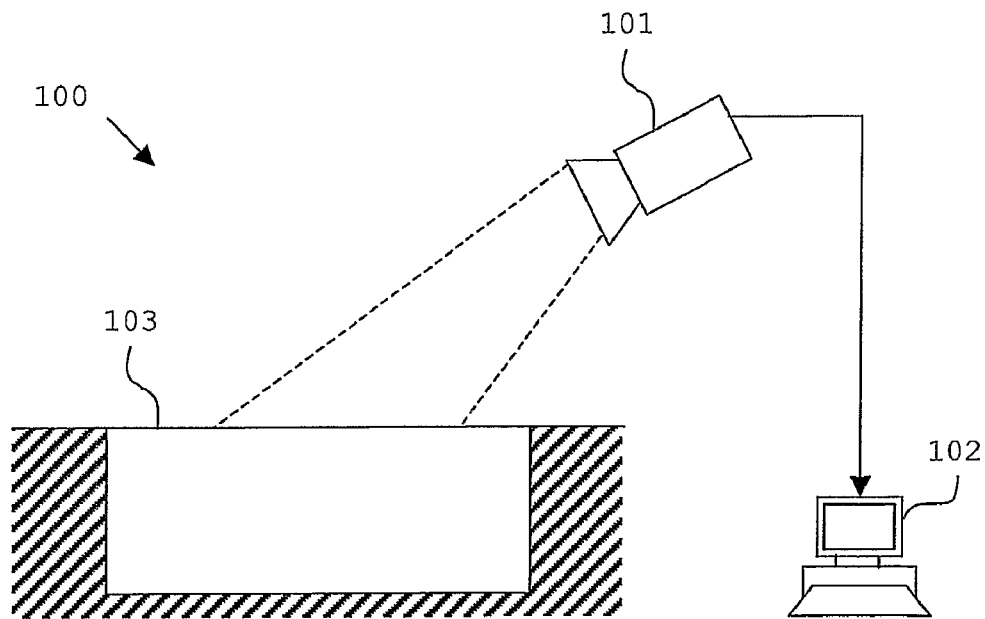
FIG. 1 shows a hardware setup of a monitoring system for monitoring a swimming pool according to an embodiment of the invention.

FIG. 1 shows a hardware setup of a monitoring system for monitoring a swimming pool according to an embodiment of the invention.

Although the hardware setup in FIG. 1 depicts the monitoring of a swimming pool, it should be understood that the hardware setup of the monitoring system can also be used for monitoring other kind of environment, such as inside a building.

The monitoring system 100 as shown in FIG. 1 comprises a visible light camera 101 or a video camera which is connected to a computer 102. The camera 101 is mounted at an elevated position and at an angle tilted downwards to a swimming pool 103 such that it is able at least to capture images corresponding to a portion of the swimming pool 103, and the activities therein. It is also possible to use a plurality of cameras (not shown) so that the images captured by the plurality of cameras can be combined to form the entire image of the swimming pool 103.

Figure 2:
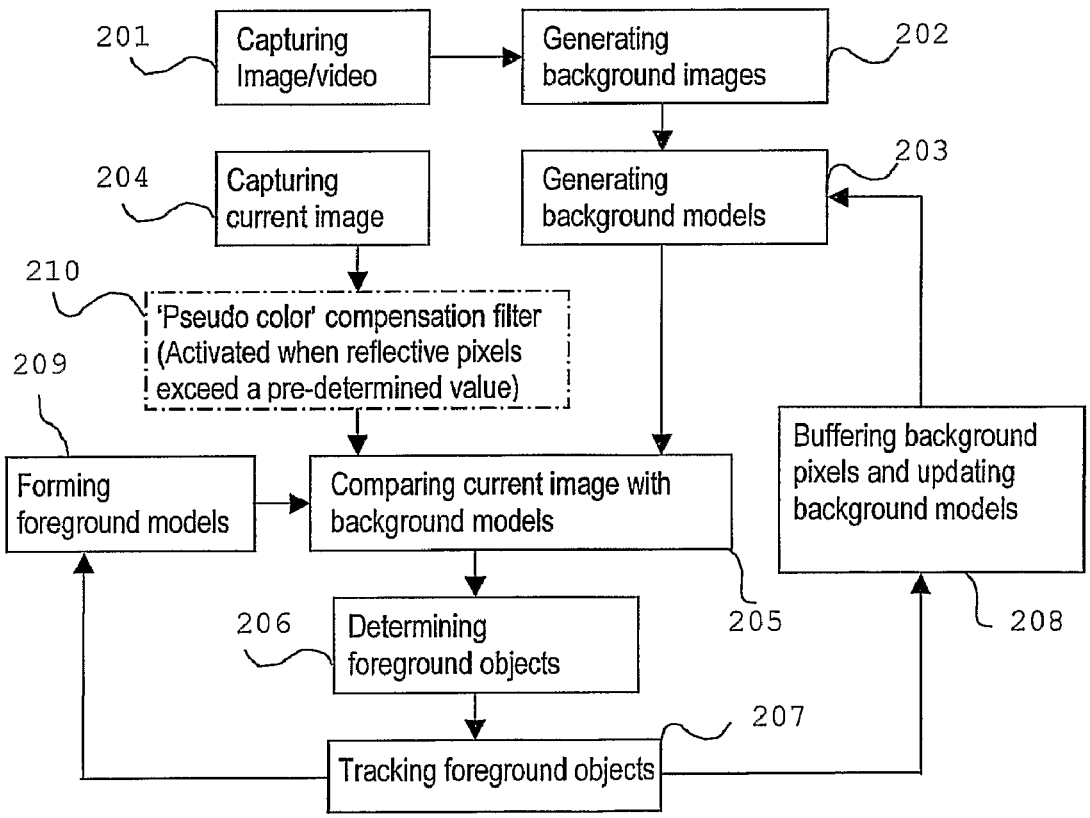
FIG. 2 shows a flow-chart of the method for detecting desired objects in an environment according to an embodiment of the invention.

The images captured by the camera 101 are processed by the computer 102 which is connected to the camera 101. The computer 102 is adapted to perform the method according to the invention to detect desired objects, which in this case are swimmers, in the swimming pool 103. The method for detecting desired objects from the environment according to the invention is summarized in the flow chart as shown in FIG. 2.

A sequence of images or video frames is captured by the camera 101 in step 201. Based on the captured images, the corresponding background images of the environment are generated in step 202. In step 203, the background images are used to generate background models which are used to represent the background of the environment.

A subsequent image, which represents the current environment, is captured by the camera 101 in step 204. The subsequent image is compared with the background models in step 205, and the foreground objects in the subsequent image are determined in step 206 based on the result of the comparison. The detected foreground objects are associated or labeled, and are tracked in step 207.

In step 208, the pixels of the subsequent image corresponding to the background are buffered and are used to update the background models which represent the background of the environment. Similarly, the pixels of the subsequent image corresponding to the foreground are used to form foreground models which represent the foreground of the environment in step 209.

A next subsequent image is acquired by the camera 101 in step 204. The next subsequent image is compared in step 205 with the foreground models which were generated previously in step 209 and the background models which were updated previously in step 208, to determine the foreground objects in the next subsequent image in step 206. The detected foreground objects in the next subsequent image are tracked in step 207, and the background pixels are used to update the background models in step 208. Similarly, the foreground pixels of the next subsequent image are used to update the foreground models in step 209.

Steps 204 to 209 are repeated for another next subsequent image of the environment captured by the camera, until the monitoring process is halted, for example by switching off the computer or by issuing a "stop" command from an operator.

In step 210, a 'pseudo color' compensation filter is activated when the number of reflective pixels (pixels which correspond to reflection in the swimming pool) of the current frame exceeds a predetermined value. The 'pseudo-color' compensation filter functions as a pre-processing step to recover pixel information of the foreground which are "hidden" or partially obscured due to reflection from water surface in the pool.

The method for detecting desired objects in an environment will now be described in detail with reference to the swimming pool as the environment, and swimmer in the swimming pool as the desired foreground objects to be detected.

Modeling the Background of the Environment

When the monitoring system is started up, an initialization process is performed, which includes generating the background models for representing the background scene of the environment, that is the swimming pool without the swimmers.

In the initialization process, a plurality of images of the swimming pool are captured by the camera. It should be noted that the images captured by the camera comprises image pixels which are represented in the RGB (Red Green Blue) color space. The captured images of the pool contain both moving and stationary swimmers as foreground, and hence, do not represent the actual background of the swimming pool. Therefore, "clean" background images of the swimming pool have to be generated.

The generation of the clean background images is performed in three steps. A skin color model is applied on the image of the swimming pool to determine the pixels of the swimmers in a pre-processing step. The color information of the determined pixels are subsequently removed. This can be performed by first predefining a coarse skin model in the CIELab color space. Subsequently, pixels with color characteristics falling within the predefined model are classified as skin pixels, and are excluded from the background formation process.

The resultant image is filtered using a temporal vector median filter to remove any residual color information of the swimmers.

Let $X_{i,j}$ be an array of color vectors of a pixel at position (i,j) collected over T number of frames:

$$X_{i,j} = \{x_{i,j}^t | t=1, \ldots, T\}, \quad (1)$$

wherein $x_{i,j}^t$ is the color vector of the $t^{th}$ image at position (i,j). The sampling rate that determines the temporal interval between two $x_{i,j}^t$ is decided empirically after considering a tradeoff between the duration needed for the initialization phase and the efficiency to remove color information of the swimmer pixels.

Performing vector median filtering on $X_{i,j}, \forall i, j$ generates a clean background image $B_1$ as:

$$B_1 = \{y_{i,j} | i=1, \ldots, N_1, j=1, \ldots, N_2\}, \quad (2)$$

wherein $N_1 \times N_2$ is the pixel dimension of the background image, and $y_{i,j}$ is obtained as:

$$y_{i,j} = \left\{ x_{i,j}^q \in X_{i,j} \,\middle|\, \min_{x_{i,j}^q} \sum_{p=1}^{T} |x_{i,j}^p - x_{i,j}^q| \right\}. \quad (3)$$

The subsequent background images $\{B_l | l=2, \ldots, T\}$ are generated by maintaining an overlapping sliding window that captures pixel vector $X_{i,j} = \{x_{i,j}^t | t=1, \ldots T+1\}$.

The background frames $\{B_l | l=1, \ldots, T\}$ are converted into the CIELab (Commission International de L'Eclairage Lab) color space, thereby forming $\{B'_l | l=1, \ldots, T\}$.

Each clean background image $B'_l$ is divided into $n_1 \times n_2$ non-overlapping s×s square pixel blocks. For example, for each background image $B'_l$ having $N_1 \times N_2$ pixels, it can be seen that $$n_1 = \left(\frac{N_1}{s}\right) \text{ and } n_2 = \left(\frac{N_2}{s}\right).$$

Consider $P_{a,b} = \{p_1, \ldots p_p\}$ as pixels collected from a square pixel block at position (a,b), wherein $1 \leq a \leq n_1$ and $1 \leq b \leq n_2$. The pixels in each pixel block, $P_{a,b} \forall a,b$, are clustered to form a set of homogeneous regions $\{R_{a,b}^1, \ldots, R_{a,b}^c\}$.

Each homogeneous region is assumed to be non-stationary for describing disturbance at the background of the environment, and changes in illumination and color due to different ambient conditions.

Each region k, $R_{a,b}^k$ can be modeled as a single Gaussian distribution, having a mean of:

$$\mu_{R_{a,b}^k} = \left\{ \mu_{R_{a,b}^k}^1, \ldots, \mu_{R_{a,b}^k}^d \right\},$$

and a standard deviation of:

$$\sigma_{R_{a,b}^k} = \left\{ \sigma_{R_{a,b}^k}^1, \ldots, \sigma_{R_{a,b}^k}^d \right\}, \quad (5)$$

wherein d is the dimension of the color space, and the probability of a pixel $x_{i,j} = \{x_{i,j}^1, \ldots x_{i,j}^d\}$ belong to $R_{a,b}^k$ can be expressed as:

$$P(x_{i,j} | \mu_{R_{a,b}^k}, \sigma_{R_{a,b}^k}) = \prod_{l=1}^{d} \frac{1}{\sqrt{2\pi}\, \sigma_{R_{a,b}^k}^l} \exp\left(-\frac{(x_{i,j}^l - \mu_{R_{a,b}^k}^l)^2}{2(\sigma_{R_{a,b}^k}^l)^2}\right), \quad (6)$$

with the assumption that the different color components of the color space are independent.

The clustering of the pixels in each pixel block $P_{a,b}$ into the homogeneous regions can be achieved by applying a hierarchical k-means [10] to form data clusters having cluster centers $\mu_{R_{a,b}^k}$ and standard deviations $\sigma_{R_{a,b}^k}$, with each data cluster corresponding to each homogeneous region k, $R_{a,b}^k$.

The clustering process on each $P_{a,b}$ is initiated by assuming each pixel vector to be one dominant data cluster. Smaller and more compact data clusters are formed in subsequent iterations through splitting the one data cluster (and subsequent splitting of the data clusters) until the distance between the cluster centers of two closest data clusters is smaller than a threshold or reaches a predetermined value. The initial background model is established as:

$$C_{a,b} = [\mu_{R_{a,b}^k}, \sigma_{R_{a,b}^k}]^T, \forall a,b \qquad (7)$$

wherein k=1, . . . , c.

Since each color component are assumed to be independent from each other, $\mu_{R_{a,b}^k}$ and $\sigma_{R_{a,b}^k}$ are determined separately for each color component.

It should be noted that the obtaining of the data clusters for each pixel block can be performed using other means such as the Fuzzy c-means [11] and mean-shift [12].

The data clusters parameters $\mu_{R_{a,b}^k}$ and $\sigma_{R_{a,b}^k}$ with k=1, . . . , c for each pixel block form the background models for the pixel block, and all the background models of all the pixel blocks represent the background scene of the environment.

The data clusters parameters $\mu_{R_{a,b}^k}$ and $\sigma_{R_{a,b}^k}$ with k=1, . . . , c for all the clean images background are subsequently determined, and all the corresponding data clusters can be combined to obtain a more accurate representation of the background scene of the environment compared to the representation of the background scene using only one background image. These data cluster parameters obtained at a particular time of day and/or at the occurrence of a certain condition of the environment can also be stored so that these stored parameters can be recalled if necessary.

Foreground Detection

After the representation of the background scene is formed, the detection of foreground objects commences.

An image is captured by the camera of the monitor system subsequently (called the subsequent image) and is sent to the computer for processing. The computer analyses the image pixels of the subsequent and determines the pixels corresponding to the foreground objects, in particular swimmers when monitoring a swimming pool.

The detection of foreground objects from the subsequent image comprises the comparing (or matching) the subsequent image with the background models of the background scene, thresholding the results of the comparison to generate a binary map, and marking connected foreground pixels to form the foreground objects.

Each pixel of the subsequent image is compared with each of background models of the pixel block corresponding to the pixel using the following:

$$D\left(x_{i,j} \mid \mu_{R_{a,b}^k}, \sigma_{R_{a,b}^k}\right) = \sum_{l=1}^{d} \frac{\left|\left(x_{i,j}^l - \mu_{R_{a,b}^k}^l\right)\right|}{\sigma_{R_{a,b}^k}^l}, \qquad (8)$$

wherein $x_{i,j}$ in this case is the pixel of the subsequent image at position (i,j). If the pixel block has more than one background models, the above equation is repeatedly calculated for all the background models in the pixel block.

After the pixel of the subsequent image is compared with the background model of the pixel block corresponding to the pixel, the pixel is further compared with the background model of other neighboring pixel blocks. The other neighboring pixel blocks which the pixel of the subsequent image is compared with are defined within a local window having dimension (2r+1)×(2r+1) in units of pixel block. The comparison of the pixel of the subsequent image with the corresponding pixel block and other neighboring pixel blocks of the background scene can be represented as:

$$D_{i,j}^{min} = \min\left\{D\left(x_{i,j} \mid \mu_{R_{a+r,b+r}^k}, \sigma_{R_{a+r,b+r}^k}\right)\right\}. \qquad (9)$$

Computing $D_{i,j}^{min} \forall i,j$ generates a difference or comparison image of the subsequent image against the background scene. A large $D_{i,j}^{min}$ value often corresponds to a foreground pixel, and a small $D_{i,j}^{min}$ value often corresponds to a background pixel.

The size of the local window can be increased or decreased depending on the estimated rate of movement of the background object in the background image and the direction of the search can be determined from the estimated direction of movement of the background object.

The determining of background pixels and foreground pixels of the subsequent image can be performed by thresholding the different image using a threshold α0 to generate a binary map:

$$M_{i,j} = \begin{cases} 0, & D_{i,j}^{min} < \alpha \\ 1, & \text{otherwise} \end{cases}, \qquad (10)$$

wherein $M_{i,j}$ denotes a pixel in the binary map, with "0"s and "1"s representing the background and foreground pixels, respectively.

The considering of neighboring pixel blocks in determining $D_{i,j}^{min}$ for forming the binary map results in a low misclassification of background pixels as foreground pixels, especially at lane dividers and shadow regions for a swimming pool environment, due to background movement.

All connected foreground pixels in the binary map are marked to form foreground objects. The foreground objects are the detected objects in the environment, i.e. detected swimmers in the swimming pool environment. Individual or isolated foreground pixels can be assumed to be foreground noise.

In order to increase the accuracy of foreground objects detection, an adaptive thresholding process is used instead of a single threshold α for detecting foreground objects.

Figure 3:
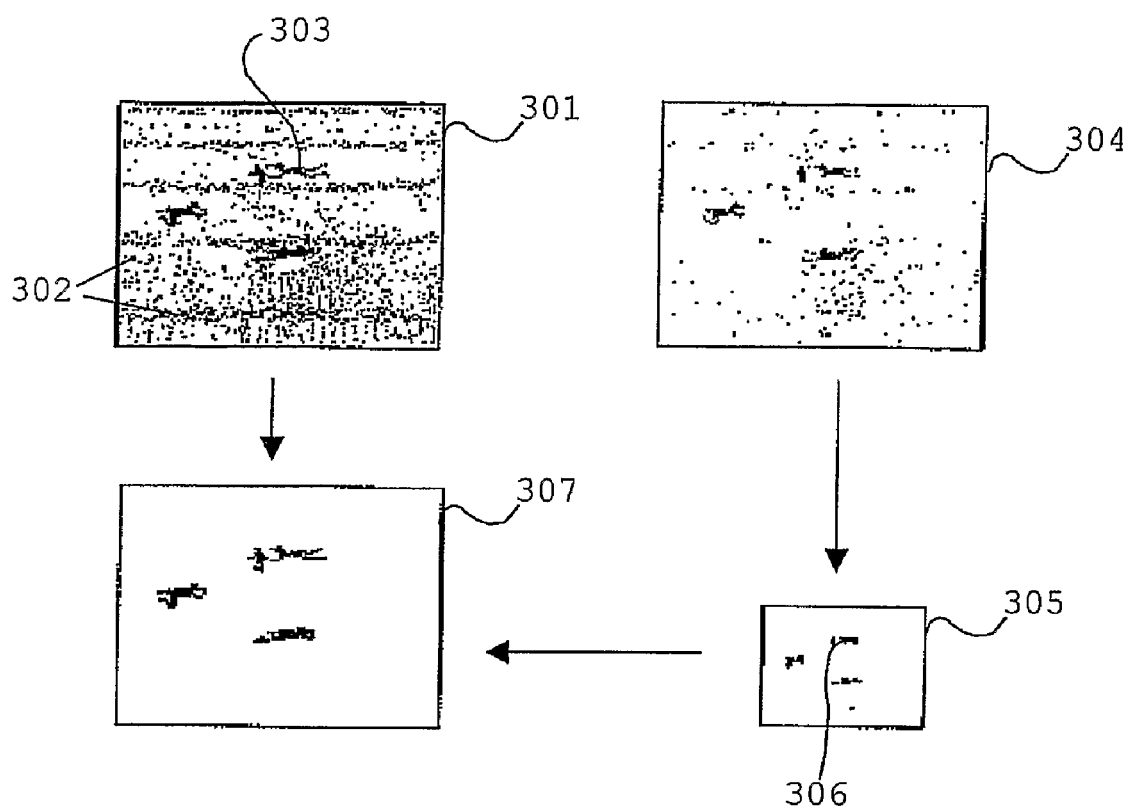
FIG. 3 shows an example of a low-threshold binary map, a high-threshold binary map, a parent binary map and the results of the foreground objects detected based on the low-threshold binary map and the parent binary map using the adaptive thresholding process according to an embodiment of the invention.

The adaptive thresholding process combines the principle of thresholding-with-hysteresis, denoising and connected component grouping for detection of foreground objects. The adaptive thresholding process is performed based on a hierarchical structure as shown in FIG. 3.

A low-threshold binary map 301 is generated using equation (10) based on a low threshold value $\alpha_l$. It can be seen that the low-threshold binary map comprises lots of foreground noise. However, a good segmentation of the foreground objects has also been obtained in the low-threshold binary map 301.

A high-threshold binary map 304 is generated using equation (10) based on a high threshold value $\alpha_h$. Compared to the low-threshold binary map 301, the high-threshold binary map 304 has significantly less foreground noise 302, but also has a poorer segmentation of the foreground objects 303.

A parent binary map 305 is constructed based on the high-threshold binary map 304. The parent binary map 305 has a lower resolution compared to the low-threshold binary map 301 and the high threshold binary map 304. Each element in the parent binary map 305 correspond to a block of pixels in the high-threshold binary map 304, and is labeled "1" if the number of foreground pixels in the pixel block of the high-threshold binary map 304 exceeds a predefined value. Otherwise, the element is labeled as "0". Therefore, the parent binary map 305 has very low foreground noise. The connected elements having value "1" are marked to form connected foreground portions 306.

The low-threshold binary map 301 is compared with the parent binary map 305 to form to generate the detected objects image 307. The foreground objects in the low-threshold binary map 301 are determined to be the detected objects in the environment only if each foreground object 303 corresponds to a connected foreground portion 306 in the parent binary map 305.

Thus, the adaptive thresholding process has a high foreground detection sensitivity and a low mis-classification error of classifying moving background as foreground.

Modeling of the Foreground

After the foreground objects in the subsequent image have been detected, the foreground objects can be represented by forming foreground models. The formation of foreground models is similar to that of forming background models to represent the background scene of the environment.

The subsequent image is divided into a plurality of pixel blocks, which should preferably correspond to the pixel blocks of the background image. For each pixel block of the subsequent image comprising one or more foreground pixels, a data cluster (or a region) is formed by clustering the foreground pixels in the pixel block to form a foreground model for representing the foreground in the pixel block. The data cluster can be described by a mean value (or cluster center) and standard deviation. It should be noted that a set of homogeneous regions or data clusters can be formed in each pixel block instead.

The foreground models are used for comparing with the pixels of a next image to determine the foreground pixels in the next image. When the pixels of the next image are determined as foreground pixels, they will not be compared with the background models of the background scene to avoid unnecessary processing overheads. For pixels of the next image which are not determined as foreground pixels based on the foreground models or which do not have any corresponding foreground models for comparison, they are determined whether they are background or foreground pixels by comparing with the background models of the background scene as described above.

The comparison between the pixels of the next image and the foreground models of the subsequent image can be described as:

$$D^f = \{D_{i,j}^{fmin} | i=1,\ldots,M; j=1,\ldots,N\}, \quad (11)$$

wherein M×N is the pixel dimension of the subsequent image.

Pixels satisfying the condition $$D_{i,j}^{fmin} < D_{i,j}^{min} \quad (12)$$

are classified as high confidence foreground pixels, and are determined as foreground pixels accordingly. Those pixels not determined as high confidence foreground pixels are determined as either background or foreground pixels using the adaptive thresholding process described above.

Updating of Background Models

The background models of the background scene are recursively updated to adapt to outdoor environmental changes, for example illumination changes due to sudden block of the sun by clouds, ripple movement of water surfaces, etc.

After the background pixels of the subsequent image are determined, the background pixels are buffered, and used to update the background models by:

$$\mu_{R_{a,b}^k}^t = (1-\rho)\mu_{R_{a,b}^k}^{t-1} + \rho\mu_{R_{a,b}^k}^t, \quad (13)$$

$$\sigma_{R_{a,b}^k}^t = (1-\rho)\sigma_{R_{a,b}^k}^{t-1} + \rho\sigma_{R_{a,b}^k}^t, \quad (14)$$

wherein $$\rho = \frac{1}{T}$$

is the learning factor for adapting to current changes, and T was defined above as the number of "clean" background images collected for constructing the initial background models. The above equations (13) and (14) is a recursive linear interpolation scheme for continuously updating the background models which shares some similarities as the updating scheme used in [5].

In addition, the ability for the method according to the invention to create and destroy data distributions (background models) for representing the background scene is incorporated to maintain a dynamic background representation of the background scene. Each data distribution of the background is given a lifespan of T frames. If there is no pixel being classified to any existing data distribution, the existing data distribution will be eliminated after T frames.

Creating new data distributions is essential for learning projection of new background objects which have not been captured during the initial background modeling process. A new data distribution, in particular a new Gaussian distribution, is created based on the pixels which is not classified to any existing data distribution.

The presence of noise may corrupt the statistical property of the new distribution, and therefore, the new distribution is only created if the standard deviation of its color is smaller than a predefined value. The predefined value can be determined from experiments.

Updating of Foreground Models

The foreground models representing the foreground of the environment are also updated recursively to adapt to the movement of foreground objects, and the appearing and disappearing of foreground objects from the environment. Specifically, the cluster centers and the standard deviations of the foreground data distributions of the subsequent image are updated based on the foreground pixels determined in a next image using recursive linear interpolation scheme as shown in equation (13) and (14) above. Alternatively, the foreground models representing the foreground of the environment are recalculated every time when any foreground is detected in the currently processing frame. Such recalculation of foreground model can be performed in real-time since the number of pixels involved in the recalculation of foreground model is small.

Foreground Pixels Compensation and Enhancement

When some of the foreground objects are partially camouflaged, or are in areas reflecting light from a light source, the detection of such foreground objects becomes difficult, as the foreground pixels are not easily detectable.

Such pixels can be processed in a pre-processing step before comparing such pixels with the background and/or foreground models to determined whether such pixels are background pixels or foreground pixels.

In the existing art, a polarizing filter fixed in front of the camera lens is used to filter light reflection from lighting source [14]. However, the need to detect the incident polarization angle of the reflective light limits its use in static background. In other examples, spatial analysis is used to compensate missing pixels of camouflaged foreground objects from a static background [8]. Also, temporal information is used to detect foreground objects under time-varying illumination [9]. These existing methods generally show a trade-off among false positive detection, noise suppression and detection of camouflaged targets. According to the method of the invention, both spatial and temporal information are used to compensate the pixels of the partially camouflaged foreground objects.

According to the invention, each pixel of the subsequent image is first classified based on the motion frequency of the pixel. The motion frequency of the pixel is the fluctuation of the pixel value over time. Depending on the motion frequency of each pixel of the subsequent image, the pixels of the subsequent image can be classified into three categories below:
1. Pixels having low motion frequency. Pixels having low motion frequency generally correspond to then background pixels.
2. Pixels having medium motion frequency. Pixels having medium motion frequency generally correspond to the foreground pixels in the reflective area and/or pixels under artificial lighting.
3. Pixels having high motion frequency. Pixels having high motion frequency generally correspond to pixels of fast moving foreground objects or noise.

Let $f_{x,y}^{i-N}, f_{x,y}^{i-n+1}, \ldots f_{x,y}^{i}$ be the values (intensity, chrominance, etc) of a pixel at spatial location (x,y) for N+1 consecutive frames. The motion frequency of the pixel at location (x,y) is denoted as:

$$\varpi_{x,y}^{i} = \frac{1}{M} \sum_{j=0}^{N} P_{x,y}^{j}, \quad (15)$$

wherein M is the sampling rate of video frames, and $$P_{x,y}^{j} = \begin{cases} 1, & D_{x,y}^{i,j} > T \\ 0, & \text{otherwise} \end{cases}, \quad (16)$$

wherein $D_{x,y}^{i,j}$ is the frame difference of the pixel between frame i and frame j, or the frame difference of the pixel between frame i and the background, i.e.

$$D_{x,y}^{i,j} = |f_{x,y}^{i} - f_{x,y}^{j}|, \quad (17)$$

and T is determined from experiments.

The defined motion frequency is efficient in measuring information about the presence of moving objects and dynamic background by measuring the total number of large fluctuation of a pixel's value over a temporal window centered around consecutive frames.

After the pixels of the subsequent image are classified according to the three categories defined above, appropriate filtering processes are performed on the pixels in each category as below:

$$y_{x,y}^{i} = \begin{cases} s_{x,y}^{i}, & \varpi > T_b \\ g_{x,y}, & T_a < \varpi \leq T_b \\ f_{x,y}^{i}, & \varpi \leq T_a \end{cases} \quad (18)$$

wherein $s_{x,y}^{i}$ is the output of a mean filter, $g_{x,y}$ is the output of a pseudo-color compensation filter, and $T_a$ and $T_b$ are thresholds which are set arbitrarily at one third and two third of N/M, respectively. No filtering process is performed on the background pixels to avoid unnecessary blurring of the background.

Mean filtering is performed on pixels within a (2n+1)×(2n+1) local window as:

$$s_{x,y}^{i} = \frac{1}{(2n+1)^2} \sum_{j=-n}^{n} \sum_{k=-n}^{n} f_{x+j,y+k}^{i}. \quad (19)$$

Generally, n can be set at 1 to define a 3×3 window to remove undesirable noise.

The pseudo-color compensation filter is adapted to generate a "pseudo-color" for the pixel of the subsequent image located in a compensated area, such as reflective area from a light source.

Let $W_{x,y}$ be a set of smoothed pixels for N+1 successive frames and $\forall x, y \in C$, where C is the set of pixels belonging to the compensated area, i.e.

$$W_{x,y} = \{s_{x,y}^{i+p}; -N \leq p \leq N\} \quad (20)$$

The output of the pseudo-color compensation filter, $g_{x,y}$, is defined by:

$$g_{x,y} = R_{x,y},$$

wherein $R_{x,y}$ denotes the average color of pixels in $W_{x,y}$, except the color due to reflection from the light source, for example white color due to water reflection.

In the swimming pool environment, the pseudo-color compensation filter provides color estimation of the pixels in the compensation area based on the average color of the pixels across consecutive frames except the white color of water reflection. The pseudo-color compensation filter is thus effective in removing effects of light reflections glistening from the pool's surface and estimating the color of the occluded part of the foreground objects caused by water reflection.

After pseudo-color filtering, there may be a possibility of misclassifying reflective portions as foreground. Such misclassified reflective portions could be processed in a post-processing step after the foreground detection.

According to an embodiment of the invention, before determining the foreground object, a portion-based verification procedure may be performed by considering the color statistical properties of the reflective portion. Foreground object most often has a smaller intensity value compared with the intensity of a reflective portion. A constraint on determining foreground portions can therefore be imposed as:

$$P_b < T_b,$$

wherein $P_b$ is the parameter of color distribution of portions, such as the mean of color distribution of portions, standard deviation of color distribution of portions or the average means of different homogenous clusters in the color distribution of portions.

The foreground object is verified if the computed statistical parameter of the portion is smaller than the given threshold $T_b$. Otherwise, a detected reflective portion is removed.

Experimental Results

A real-time surveillance system has been set up for monitoring an outdoor Olympic-sized swimming pool. The system comprises a network of overhead cameras mounted around the pool such that the entire pool is covered by the combined view of all the cameras. The method according to the invention for detecting foreground objects was incorporated into a computer connected to the cameras for detecting foreground objects from the images captured by the cameras.

In the real-time surveillance system, images are captured by each camera at 4 frames per second. Each image or frame size is 288×384, and the pixel block of each frame comprises 16 pixels (i.e. 4×4 pixel block).

FIG. 4(a) to FIG. 4(h) show the consecutive detection of swimmers at the pool from 9 am to 8 pm on a weekday. The FIG. 4(a) to FIG. 4(h) are arranged in chronological order to depict events happened and challenges encountered at different time intervals from morning to night. Various challenging events such as sunlight reflection in the morning, high swimming activity during a swimming lesson, presence of distinct shadow, makes the detection of swimmer difficult as the background appears to be very noisy and swimmers occasionally become invisible. Despite the challenges mentioned above, the method according to the invention is able to perform in a satisfactory and robust manner.

Figure 4A:
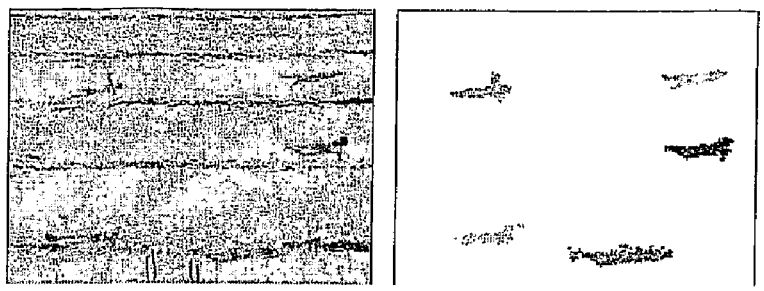
FIGS. 4a to 4h show a sample of captured images of a swimming pool from 9 am to 8 pm on a weekday and their corresponding foreground objects scene detected according to the invention.
Figure 4B:
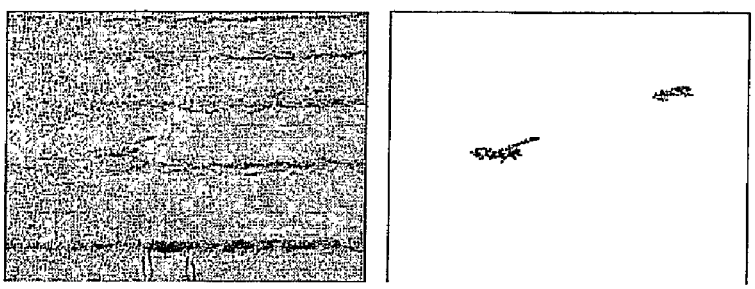
Figure 4C:
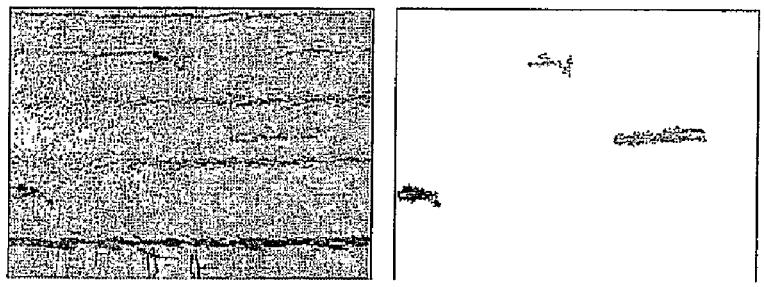
Figure 4D:
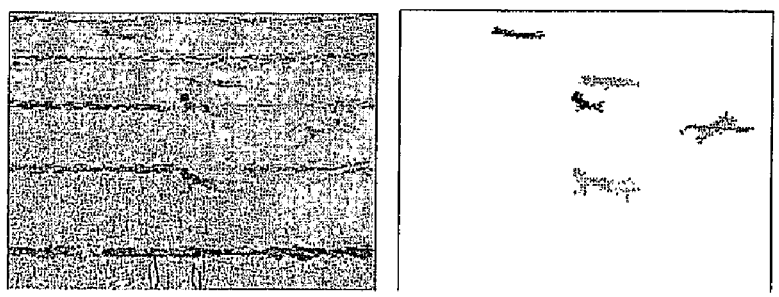
Figure 4E:
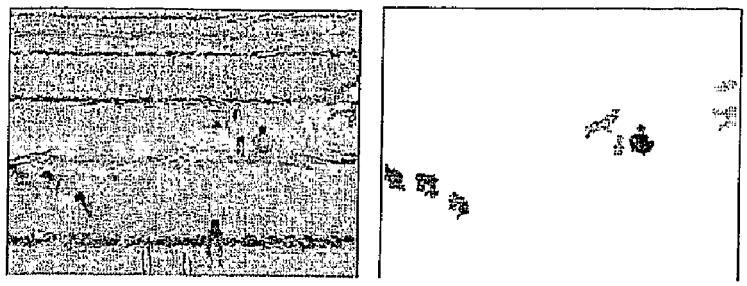
Figure 4F:
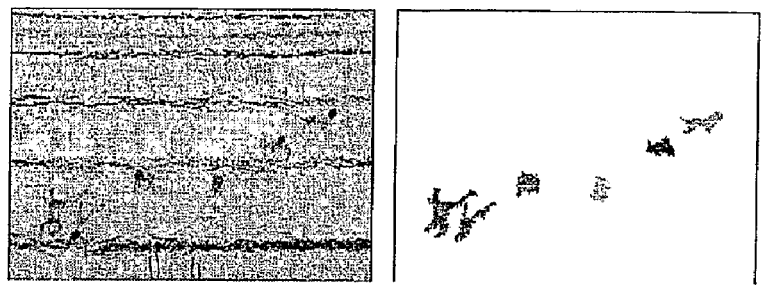
Figure 4G:
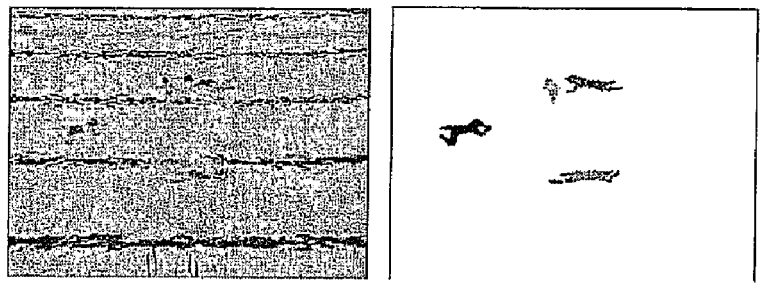
Figure 4H:
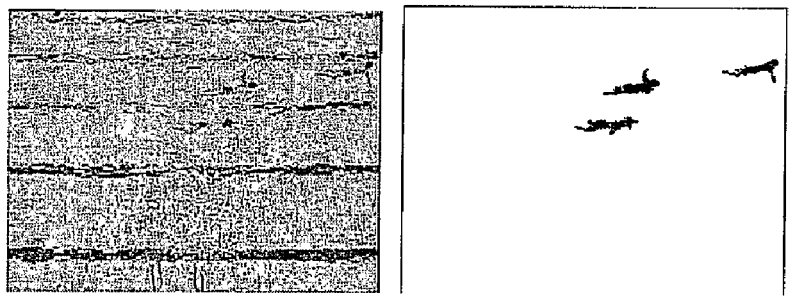

In FIG. 4(b) it can be seen that the method according to the invention is able to detect a swimmer on the left side once the simmer becomes visible. In FIG. 4(c), the method according to the invention is able to detect the swimmer within the reflective area. In FIG. 4(f) and FIG. 4(g), the method according to the invention is able to detect swimmers in a crowded situation, even if some of the swimmers are very small.

Figure 5A:
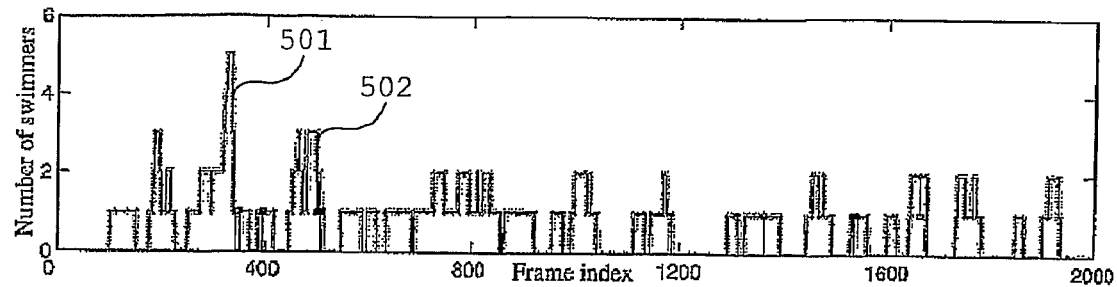
FIGS. 5a to 5c show a comparison between the number of swimmers detected using the method according to the invention and the actual number of swimmers in the swimming pool for three different video streams.
Figure 5B:
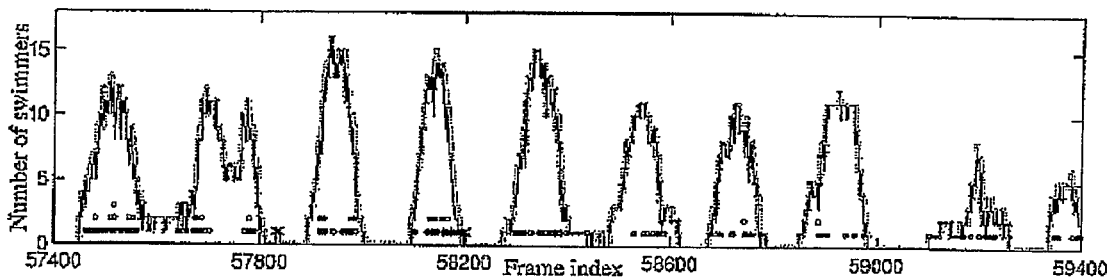
Figure 5C:
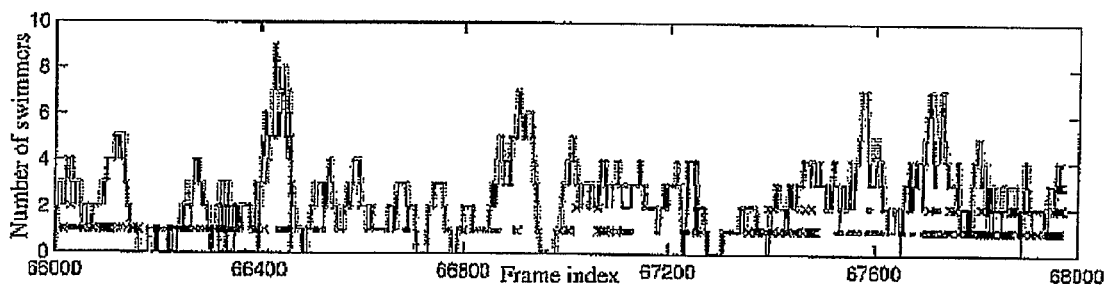

The method according to the invention is also evaluated objectively in terms of its accuracy in detecting swimmers while maintaining low false foreground noise. FIG. 5a to FIG. 5c shows the results obtained when applying the method on three selected video streams with length of 2000 frames at different time intervals. The horizontal and vertical axes of FIG. 5a to FIG. 5c represent the frame index and the number of swimmers detected in each frame, respectively. The line 501 provides the actual number of swimmers present, and line 502 shows the number of swimmers detected by the method. Both the number of false negative (miss detection of swimmers) and false positive (mis-classification of background noises as foreground objects) are marked by symbols "o" and "x", respectively.

FIG. 5a depicts a scenario of the swimming pool during a weekday, recording a total of 1500 swimmers in the video sequence. Among them, 1473 swimmers have been correctly detected, achieving a detection rate of 98.20% as shown in the FIG. 5a that line 502 follows closely line 501. The 1.80% of miss detection is mainly due to the low contrast between the swimmers and the background, and the small size some of the swimmers. Further, the method according to the invention has achieved a 0% of false positive rate, meaning that there is no mis-classification of background noises as foreground objects. Therefore, it can be seen that the method according to the invention is robust in adapting to the dynamic background movements.

FIG. 5b shows the result of the method according to the invention obtained during a swimming lesson. This is a more complicated scenario compared to that of FIG. 5a, as more swimmers are involved, including swimmers that are small in size. In addition, the presence of more swimmer activities causes greater water disturbance to the background. There are a total of 8974 swimmers in the video sequence, and the method according to the invention results in only 4.2130% of false negative and 0.1658% of false positive. This is due to some parts of the lane divider of the swimming pool being mis-classified as foreground occasionally.

FIG. 5c shows the result of the method according to the invention for detecting foreground objects during nighttime. The method according to the invention achieves a 3.9186% of false negative and a 5.7473% of false positive in the video sequence of 5359 swimmers. A higher false positive than that in the daytime video sequence is mainly due to the missing of swimmers when they are in the reflective area.

Figure 6:
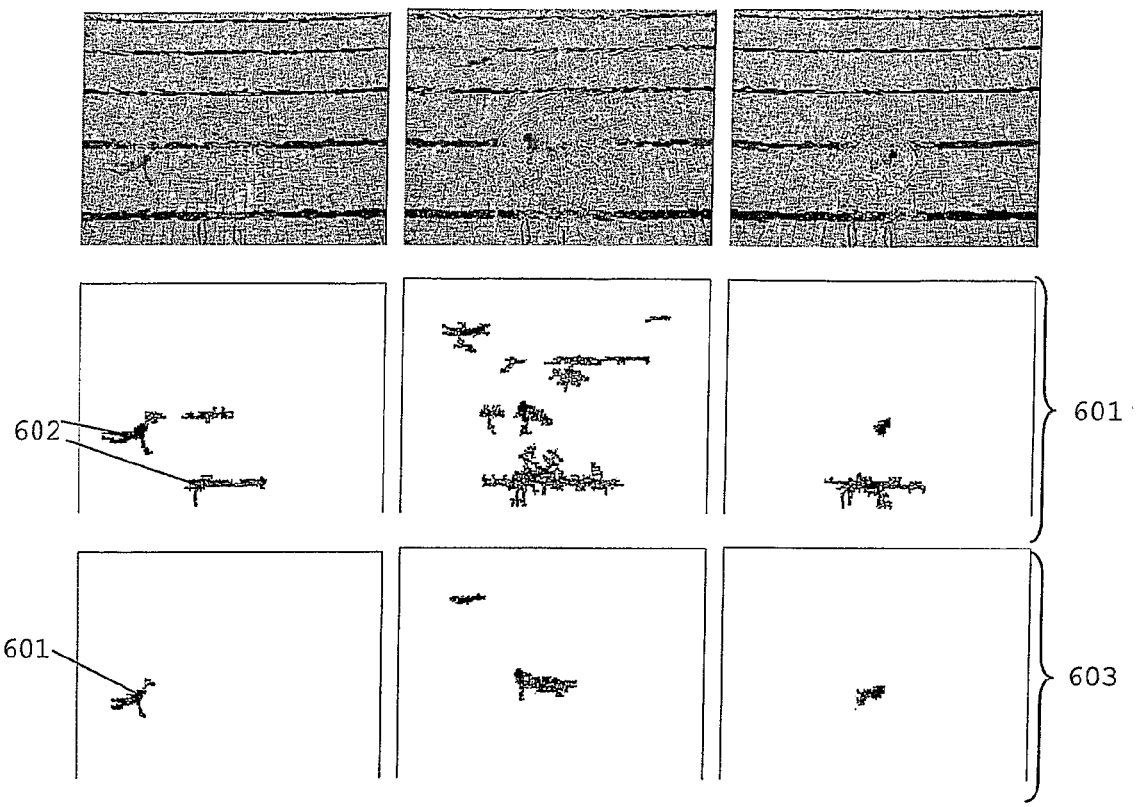
FIG. 6 shows a comparison of detected foreground objects from the swimming pool during nighttime using the method according to the invention with and without using a pseudo-color filter.

FIG. 6 demonstrates a comparison of the method according to the invention with and without using the pseudo-color compensation filter. The $2^{nd}$ row of pictures 601 in FIG. 6 shows the detected foreground objects 602 without using the pseudo-color compensation filter, and the $3^{rd}$ row of pictures 603 shows the detected foreground objects 604 after the pseudo-color compensation filter has been applied.

As evident from FIG. 6, it is difficult to correctly extract parts of the swimmers that were occluded by water reflections. Moreover, the movement of the lane dividers due to water ripples were wrongly classified as foreground regions. When the pseudo-color compensation filter is applied, the detection of foreground objects improved drastically. Therefore, the pseudo-color compensation filter can effectively enhance the detection of swimmers under challenging conditions.

Figure 7:
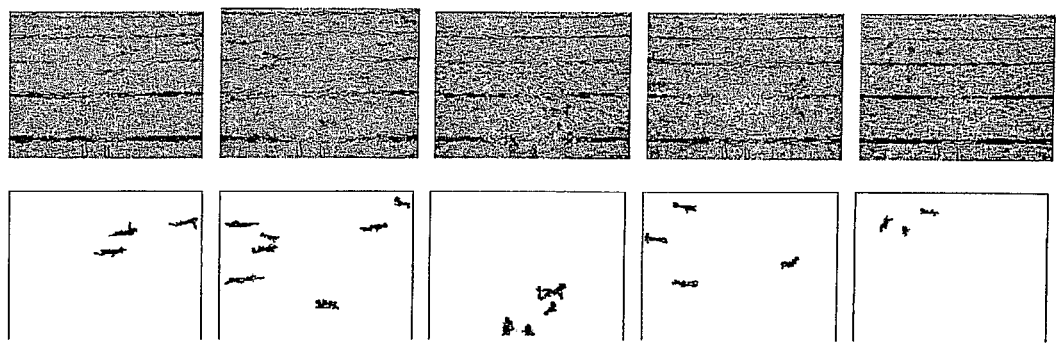
FIG. 7 shows the foreground objects detected according to the invention in the swimming pool during nighttime comprising a reflective area of light from the water.

FIG. 7 demonstrates the other results of the method according to the invention obtained under different challenging conditions at night. In FIG. 7, the reflection area due to water changes from a big patch of spreaded-out area to a small but concentrated area over time.

Figure 8:
FIG. 8 shows a comparison of the detected foreground objects from the swimming pool using the method according to the invention and using the W4 method.

The results obtained using the method according to the invention is also compared with that obtained from using the well-known W4 system [6] as shown in FIG. 8. The first row of pictures 801 shows the captured images of the environment. The second row of pictures 802 shows the segmentation of the foreground objects according to the method of the invention. The third rows of pictures 803 shows the segmentation of the foreground objects using the W4 system. As can be seen from FIG. 8, the method according to the invention is able to achieve better segmentation in terms of capability to detect small swimmers and suppressing errors due to background dynamics.

An objective comparison of the error rate, i.e.

Error rate, $ER = (100 \times \text{Error pixel count})/(\text{Frame size})$, between the method according to the invention and the W4 system for the segmentation results of FIG. 8 is shown in table 1 below:

TABLE 1

| | ER (%) | | | |
|---|---|---|---|---|
| Proposed algorithm | 2.64 | 2.10 | 2.51 | 1.85 |
| W4 | 5.41 | 3.36 | 3.63 | 3.00 |

As can be seen from Table 1, the method according to the invention has lower segmentation error rate.

The following references are cited in this document:

[1] C. Wren, A. Azarbayehani, T. Darrell, T. and A. Pentland, "Pfinder: Real-time tracking of the human body," IEEE Trans. Pattern Anal. Machine Intell., vol. 19, no. 7, pp. 780-785, 1997.

[2] N. Friedman and S. Rusell, "Image segmentation in video sequence: A probabilistic approach," In Proc. Thirteenth Conf. Uncertainty in Artificial Intelligence, 1997.

[3] W. E. L Grimson, C. Stauffer, R. Romano and L. Lee, "Using adaptive tracking to classify and monitor activities in a site," In Proc. Computer Vision and Pattern Recognition, pp. 22-29, June 1998.

[4] C. Stauffer and W. E. L Grimson, "Adaptive background mixture models for real-time tracking," In Proc. Computer Vision and Pattern Recognition, vol. 2 pp. 246-252, 1999.

[5] C. Stauffer, W. Eric and L. Grimson, "Learning patterns of activity using real-time tracking," IEEE Trans. Pattern Anal. Machine Intell., vol. 22, no. 8, pp 747-757, 2000.

[6] I. Haritaoglu, D. Harwood, and L. S. Davis, "W4: Real-time surveillance of pelple and their activities," IEEE Trans. Pattern Anal. Machine Intell., vol. 22 no. 8, pp. 809-830, 2000.

[7] A. Elgammal, R. Duraiswami, D. Harwood and L. S. Davis, "Background and foreground modeling using non-parametric kernel density estimation for visual surveillance," Proc IEEE, vol. 90, no. 7, pp. 1151-1163, July 2002.

[8] T. E. Boult, R. J. Micheals and X. Gao, "Into the Woods: Visual surveillance of noncooperative and camouflaged targets in complex outdoor settings," Proc. IEEE, vol. 89, no. 10, pp. 1382-1402, 2001.

[9] S. C. Liu, C. W. Fu and S. Chang, "Statistical change detection with moments under time-varying illumination," IEEE Trans Image Processing, vol. 7, no. 9, pp. 1258-1268, 1998.

[10] R. O. Duda, P. E. Hart and D. G. Stork, "Pattern Classification," John Wiley & Sons, 2001.

[11] J. C. Bezdek, "Pattern recognition with fuzzy objective function algorithm," Plenum Press, NY., 1981.

[12] D. Comaniciu and P. Meer, "Mean shift: A robust approach toward feature space analysis," IEEE Trans. Pattern Anal. Machine Intell., vol. 24, no. 5, pp. 603-619, 2002.

[13] J. Astola, P. Haavisto and Y. Neuvo, "Vector median filters," IEEE Proceedings, vol. 78, no. 4, pp. 678-689, 1990.

[14] H. Fujikake, K. Takizawa, T. Aida, T. Negishi and M. Kobayashi, "Video camera system using liquid-crystal polarizing filter to reduce reflected light," IEEE Trans. Pattern Anal. Machine Intell., vol. 44, no. 4, pp. 419-426, 1998.

What is claimed:

1. A method for detecting at least one object in an environment by a monitoring system, the method comprising:

taking at least one image of the environment by means of an image capturing device in the monitoring system;

generating at least one background image of the environment based on the at least one image, the background image comprises a plurality of pixels;

dividing the background image into a plurality of pixel blocks, wherein each of the pixel blocks includes more than one of the plurality of pixels in the background image;

forming at least one data cluster of each pixel block based on at least one feature of background pixels in the pixel block, wherein the at least one cluster is modeled as a data distribution having a mean value and a standard deviation from the mean value;

taking a subsequent image of the environment;

comparing each pixel of the subsequent image with the at least one data cluster of the pixel block of the background image corresponding to said pixel to generate a first discrepancy value;

comparing said pixel of the subsequent image with the at least one data cluster of each of the pixel blocks of the background image defined within a local search window to generate a second discrepancy value, wherein the size of the local search window is determined based on an estimated rate of movement of a background object in the background image, and wherein the direction of movement of the local search window is determined based on an estimated direction of movement of the background object;

determining whether said pixel of the subsequent image is a background pixel or a foreground pixel based on the first discrepancy value and the second discrepancy value;

generating a binary map of the subsequent image based on the determined background pixels and the foreground pixels; and marking connected pixels in the binary map corresponding to the foreground pixels to form at least one foreground object, wherein the at least one foreground object is the at least one object detected in the environment.

2. The method for detecting at least one object in an environment according to claim 1, further comprising:

determining the pixels corresponding to the at least one object in the environment from the at least one image of the environment taken by the monitoring system by applying a shade of intensity or color model to the at least one image;

removing the information of the pixels representing the at least one object; and filtering the resultant image of the environment using a filtering scheme that takes into account a number of previous images to remove any residual information of the pixels representing the at least one object, thereby generating the background image of the environment.

3. The method for detecting at least one object in an environment according to claim 2, wherein a temporal vector median filter is used as the filtering scheme that takes into account a number of previous images to filter the resultant image of the environment.

4. The method for detecting at least one object in an environment according to claim 1, further comprising updating the at least one data cluster of each pixel block of the background image based on the background pixels determined in the subsequent image.

5. The method for detecting at least one object in an environment according to claim 4, wherein the at least one data cluster of each pixel block of the background image is updated using a recursive linear interpolation scheme.

6. The method for detecting at least one object in an environment according to claim 1, wherein the at least one data cluster of each pixel block of the background image at a predetermined time and/or at the occurrence of a predetermined condition of the environment is stored.

7. The method for detecting at least one object in an environment according to claim 1, further comprising:

dividing the subsequent image into a plurality of pixel blocks; and for each pixel block of the subsequent image which comprises at least one foreground pixel, forming at least one data cluster based on at least one feature of the at least one foreground pixel in the pixel block, wherein the at least one cluster is modeled as a data distribution having a mean value and a standard deviation from the mean value;

wherein each pixel of a next subsequent image is compared with the at least one data cluster corresponding to the foreground pixel of the pixel block of the subsequent image corresponding to said pixel, if any, to determine if said pixel is a foreground pixel.

8. The method for detecting at least one object in an environment according to claim 7, wherein each pixel of the next subsequent image is further compared with the at least one data cluster corresponding to the foreground pixel of a further pixel block of the subsequent image, if any, to determine if said pixel is a foreground pixel, wherein the at least one further pixel block of the subsequent image is adjacent to the pixel block of the subsequent image corresponding to said pixel.

9. The method for detecting at least one object in an environment according to claim 7, further comprising updating the at least one data cluster of the pixel blocks of the subsequent image comprising at least one foreground pixel based on the foreground pixels determined in the next subsequent image.

10. The method for detecting at least one object in an environment according to claim 9, wherein the at least one data cluster of the pixel blocks of the subsequent image comprising at least one foreground pixel is updated using a recursive linear interpolation scheme.

11. The method for detecting at least one object in an environment according to claim 1, wherein the first discrepancy value is generated as a difference between the mean value of the at least one data cluster of the pixel block of the background image corresponding to the pixel of the subsequent image and the value of the corresponding feature of said pixel of the subsequent image, and divided by the standard deviation of the at least one data cluster of the pixel block of the background image.

12. The method for detecting at least one object in an environment according to claim 11, wherein the second discrepancy value is generated as a difference between the mean value of the at least one data cluster of the further pixel block which is adjacent to the pixel block of the background image corresponding to the pixel of the subsequent image and the value of the corresponding feature of said pixel of the subsequent image and divided by the standard deviation of the at least one data cluster of the pixel block of the background image.

13. The method for detecting at least one object in an environment according to claim 12, wherein the pixel of the subsequent image is determined as a background pixel if the minimum of the first discrepancy value and the second discrepancy value is smaller than a predetermined threshold, else the pixel of the subsequent image is determined as a foreground pixel.

14. The method for detecting at least one object in an environment according to claim 13, further comprising:
determining a plurality of background pixels and foreground pixels based on the pixels of the subsequent image using a further predetermined threshold, wherein the further predetermined threshold has a value that imposes a stricter condition for determining a pixel to be a foreground pixel than the predetermined threshold;
generating a further binary map based on the background pixels and foreground pixels determined using the further predetermined threshold;
generating a modified binary map based on the further binary map, wherein each element in the modified binary map corresponds to whether the number of foreground pixels in a pixel block of the further binary map exceeds a predefined value;
marking connected elements in the modified binary map corresponding to the number of foreground pixels in the pixel block of the further binary map exceeding the predefined value to form at least one foreground portion; and
determining the at least one foreground object in the binary map to be the at least one object detected in the environment if the at least one foreground object corresponds with the at least one foreground portion in the modified binary map.

15. The method for detecting at least one object in an environment according to claim 14, wherein the further predetermined threshold has a larger value than the predetermined threshold.

16. The method for detecting at least one object in an environment according to claim 1, further comprising:
before comparing each pixel of the subsequent image with the at least one data cluster of the pixel block of the background image corresponding to said pixel, determining a motion frequency of each pixel of the subsequent image;
classifying the pixels of the subsequent image corresponding to an area which represents a noise portion based on the motion frequency of each pixel of the subsequent image; and
filtering the classified pixels corresponding to the region which represents the noise portion using a pseudo-shade filter, wherein the pseudo-shade filter is adapted to generate a pseudo-shade for the classified pixels based on an average shade information of the classified pixels, excluding the shade value which represents the noise portion.

17. The method for detecting at least one object in an environment according to claim 16, wherein the noise portion is due to reflection from a light source.

18. The method for detecting at least one object in an environment according to claim 16, wherein the average shade information of the classified pixels is obtained from a predefined number of consecutive subsequent images.

19. The method for detecting at least one object in an environment according to claim 16, further comprising
classifying the pixels of the subsequent image corresponding to a region of fast-moving foreground pixels based on the motion frequency of each pixel of the subsequent image; and
filtering the classified pixels which correspond to the region of fast-moving foreground pixels using a mean filter.

20. The method for detecting at least one object in an environment according to claim 1, wherein a camera or video camera that is sensitive to the visible light spectrum is used as the image capturing device.

21. The method for detecting at least one object in an environment according to claim 1, wherein color is used as the at least one feature of the background pixels of each pixel block for forming the at least one data cluster.

22. The method for detecting at least one object in an environment according to claim 21, further comprising converting the background image generated based on the at least one image taken by the monitoring system into a Commission International de L'Eclairage (CIE) Lab color space.

23. The method for detecting at least one object in an environment according to claim 1, wherein at least a Gaussian distribution is determined as the data distribution of the at least one data cluster in each pixel block.

24. The method for detecting at least one object in an environment according to claim 1, wherein the background image is divided into a plurality of square pixel blocks.

25. The method for detecting at least one object in an environment according to claim 1, wherein the environment is an aquatic environment and the object is a human.

26. A monitoring system for detecting at least one object in an environment, the monitoring system comprises:
- at least an image capturing device for taking a plurality of images of the environment;
- a processing unit being adapted to process and generate a background image of the environment based on the at least one image of the environment, wherein the background image comprises a plurality of pixels, and to divide the background image into a plurality of pixel blocks, wherein each of the plurality of pixel blocks includes more than one of the plurality of pixels in the background image;
- a formation unit being adapted to form at least one data cluster of each pixel block based on at least one feature of background pixels in the pixel block, wherein the at least one cluster is modeled as a data distribution having a mean value and a standard deviation from the mean value;
- a comparison unit being adapted to compare each pixel in each subsequent image from a plurality of subsequent images of the environment with the at least one data cluster of the pixel block of the background image corresponding to said pixel to generate a first discrepancy value, and to compare said pixel with the at least one data cluster of each of the pixel blocks of the background image defined within a local search window to generate a second discrepancy value, wherein the size of the local search window is determined based on an estimated rate of movement of a background object in the background image, and wherein the direction of movement of the local search window is determined based on an estimated direction of movement of the background object;
- a determination unit being adapted to determine whether said pixel of the subsequent image is a background pixel or a foreground pixel based on the first discrepancy value and the second discrepancy value;
- a generation unit being adapted to generate a binary map of the subsequent image based on the determined background pixels and the foreground pixels; and
- a marking unit being adapted to mark connected pixels in the binary map corresponding to the background pixels to form at least one foreground object, wherein the at least one foreground object is the at least one object detected in the environment.

* * * * *